2,916,305

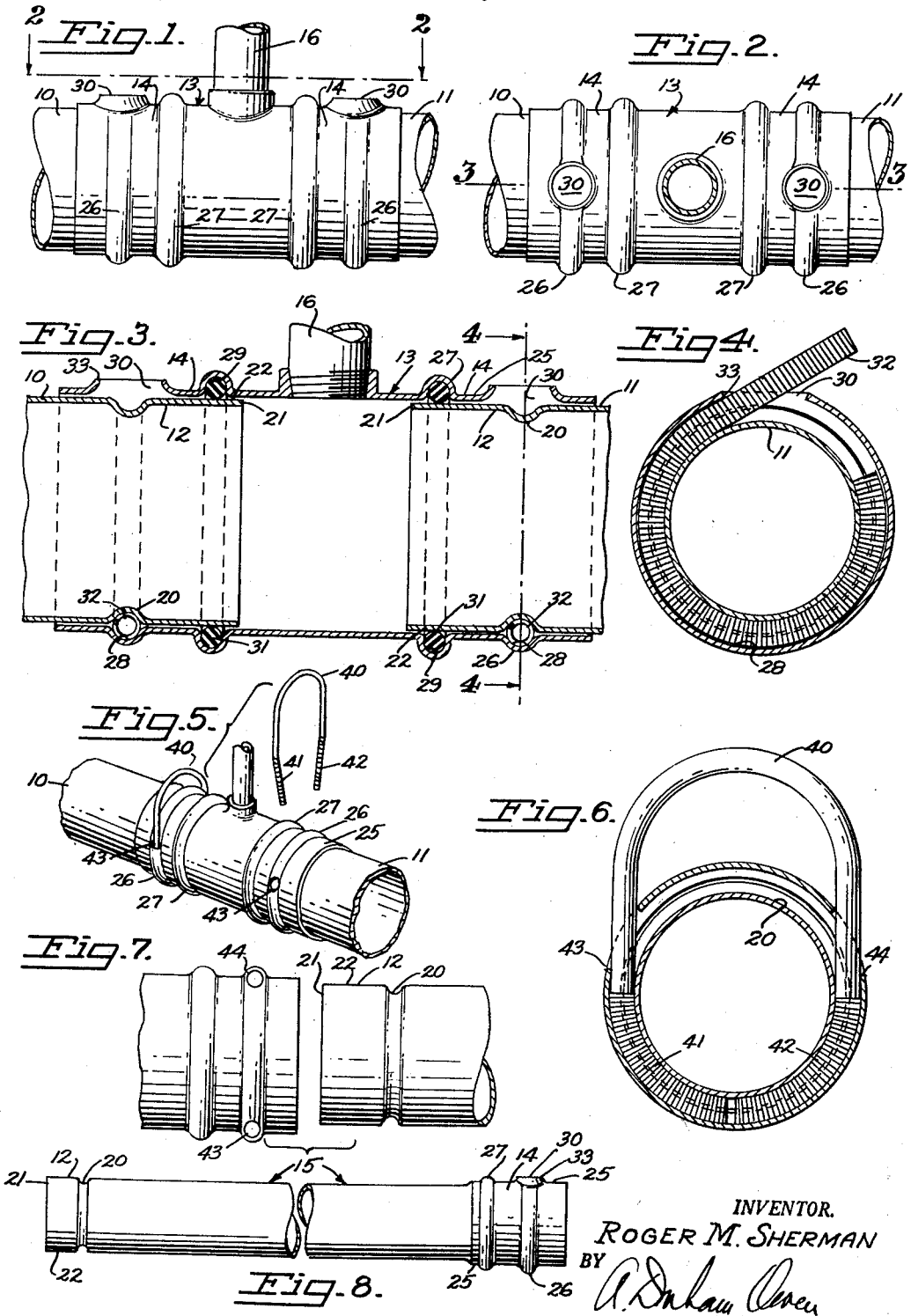
Dec. 8, 1959 R. M. SHERMAN 2,916,305
PIPE COUPLING HAVING A PARTIALLY FLEXIBLE LOCKING MEMBER
Filed May 28, 1956
INVENTOR.
ROGER M. SHERMAN
BY
ATTORNEY United States Patent Office 2,916,305
Patented Dec. 8, 1959

PIPE COUPLING HAVING A PARTIALLY FLEXIBLE LOCKING MEMBER

Roger M. Sherman, Palo Alto, Calif., assignor to W. R. Ames Company, San Francisco, Calif., a corporation of California Application May 28, 1956, Serial No. 587,885

2 Claims. (Cl. 285—5)

This invention relates to an improved pipe coupling.

This new coupling is particularly well-suited to use with portable or transportable pipe for conveying liquids and gases under substantial pressure. One example is its use to join together sections of lightweight aluminum irrigation pipe. Another example is coupling together sections of thin-walled metal pipe for conveying fluids in oil fields or mine galleries. An outstanding characteristic of the new coupling is the ease with which a secure coupling is made or disconnected, making it especially appropriate for providing a semi-permanent installation that may be used for a few weeks or months and may then be disassembled and moved to a new location.

For example, the lightweight aluminum irrigation pipe used by many farmers is, in some situations, moved about almost daily. There are other situations in which irrigation pipe is permanently installed and left in place. But there is also a third type of situation, in which the pipe is coupled together and left in one position for several weeks or months and is then uncoupled and stored or removed to and reassembled on another field, where it again remains for several weeks or months. One such instance is in starting seed crops in dry areas, where a pipe system is set up in the spring and used daily to sprinkle the crops until they are well started. Then, its use being at an end, it may be uncoupled and stored. Another instance is in irrigating potatoes; walking on the ground near potatoes tends to disturb them and reduces the crop yield, and therefore one should walk in his potato patch as seldom as possible. In this situation, there has long been a need for an irrigation system where the pipe sections are joined by a low-cost coupling that could act as a semi-permanent coupling; the system may then be set up when the eyes are planted, left until harvest time, and then disassembled so that the pipe can be stored during plowing and the planting of a cover crop.

When irrigation pipe is left undisturbed for a growing season before disassembling, the couplings tend to get covered with mud, and some couplers heretofore in use have been so plugged that it became very difficult to disconnect them. Their working parts also tended to rust or corrode so much that they could not be operated.

Also, some couplers required special connecting and disconnecting tools that had to be available when the pipe sections were to be uncoupled or coupled. The tools were an expense and a nuisance and were often miles away when they were needed.

One object of the invention is, therefore, to provide an improved, low-cost semi-permanent coupler.

Another object of the invention is to provide a semi-permanent pipe coupling which is easily connected and disconnected.

Another object is to provide a coupling that can be easily disconnected even after sitting in one place for a considerable period and becoming covered and caked with mud.

Another object of the invention is to provide a foolproof coupling unit of semi-permanent type which, once fastened, cannot accidentally become unfastened.

Another object of the invention to provide a semi-permanent type of coupling unit which can be applied and disassembled without the use of any tools whatsoever.

Another object of the invention is to provide a coupling unit which provides a positive connection between the pipe units or sections and also provides a seal against fluid leakage.

Another object is to provide a coupler made of comparatively light-gauge sheet metal which will hold high pressures due to nearly 360° engagement of locking device.

The novel coupler which solves the above problems and achieves the foregoing objects comprises male and female coupler units. The male unit is normally part of the pipe itself and includes a circumferential groove set back from its end. The female unit includes two spaced-apart, outset circumferential ribs, each providing an outset groove on its inner surface. One rib is imperforate and contains an O-ring which acts to seal against the outer wall of the male unit, which is inserted into the female unit. The other outset groove overlies the male groove and has one or more openings through which a flexible locking member is inserted from outside. This locking member comprises a flexible member which enters the space provided by the two aligned grooves and wraps around the pipe so as to interlock the grooves and retain the units together.

Other objects and advantages of the invention will appear from the following description of some preferred embodiments thereof presented in accordance with the statute.

In the drawings:

Fig. 1 is a view in side elevation of a coupling embodying the principles of the invention, shown coupled to a pair of pipe sections. The pipe sections and a riser outlet from the coupling member have been broken off to conserve space.

Fig. 2 is a top plan view of the coupling of Fig. 1, taken along the line 2—2 in Fig. 1, with the riser shown in section.

Fig. 3 is an enlarged view in elevation and section taken along the line 3—3 in Fig. 2.

Fig. 4 is a view in section taken along the line 4—4 in Fig. 3.

Fig. 5 is a partly exploded view in perspective of a partially assembled coupler comprising a modified form of the invention, with one locking member in place and the other held above the pipe prior to installation.

Fig. 6 is an enlarged view in section of the coupled portion of Fig. 5.

Fig. 7 is a plan view on a scale between that of Figs. 5 and 6 of a portion of the unit of Figs. 5 and 6 shown uncoupled.

Fig. 8 is a view in side elevation of a pipe section, broken in the middle to conserve space, with a male coupler unit on one end and a female coupler unit on the other end, both units being integral portions of the pipe section.

The novel coupling may be built in several ways, but the examples given will suffice to set forth the basic principles. Thus, in Figs. 1–4, each pipe section 10, 11 has a male coupler 12 at each end as an integral portion thereof, and the two sections 10, 11 are coupled to a sleeve 13 comprising a pair of female couplers 14, 14 in which the male ends 12, 12 are inserted. The device of Figs. 5–7 is similar. In the form of Fig. 8, a male coupler 12 is provided as one end of each pipe section 15 and the female coupler 14 as the other end, both couplers 12, 14 being integral with each pipe section 15. This latter form of the invention is especially useful in coupling oil-field pipe or other pipe where no sprinklers need be provided. Where sprinklers are to be provided, the separate coupler sleeve 13 shown in Figs. 1–7 has the advantage that the sprinkler riser 16 can be provided in the coupler sleeve 13 without having to couple on additional fittings. Obviously, a separate coupler sleeve may be made with one end male and one end female for use with the pipe having both a male and female end, if that is desired; and the sleeve may be part of such fittings as hydrants, size-reducers, elbows, T's, pumps, etc.

In any of the pipe sections 10, 11, or 15, the male coupler unit 12 is preferably provided by forming a groove 20 in the wall of the pipe by a suitable mandrel or otherwise. The annular groove 20 is preferably generally semicircular in cross section and spaced at a predetermined distance from the end 21 of the pipe to provide a smooth-walled end portion 22. As shown herein, the diameter of this end portion is the same as that of the remainder of the pipe, but it may be smaller instead of providing a female coupler 14 of enlarged diameter.

The female coupler 14 may be at the opposite end of the same pipe section from the male coupler (Fig. 8) or may be in a separate coupler (Figs. 1–7). In either event it comprises a tubular portion 25 of larger diameter than the male coupler 12 and has a pair of spaced-apart radially outset annular ribs 26, 27. The ribs 26, 27 may be provided by rolling or forming them over a suitable mandrel, and their inner surfaces provide grooves 28, 29 which are preferably generally semicircular in cross section. The groove 28 nearest the end of the female coupler is the locking groove and is perforate, being provided with at least one access opening 30 through its wall. The other groove 29 is imperforate and is adapted to receive a rubber O-ring 31, which may be of standard durometer and shape or may be somewhat softer than that ordinarily used. The O-ring 31 is held captive and is used as a sealing gasket. It is not worked back and forth during operation. Little interference is needed in such a ring, 0.010″ being sufficient for sealing operation, and it will hold more than one thousand pounds pressure without leaks. Thus, where the inner diameter of the annular groove 29 is 3¼ inches, the outer diameter of the O-ring 31 may be approximately 3⅜ inches with its inner diameter 3 inches, and it will give proper sealing against the pipe wall 22 having a 3-inch outer diameter, due to compression of the O-ring 31 in the groove 29.

The locking groove 28 is also preferably substantially continuous, the opening 30 being provided by punching. During coupling, the grooves 20 and 28 are aligned to provide a keyway, and flexible locking means is inserted between them, the locking together of these parts holding the coupling. The mechanical force of this locking means that the O-ring 31 is relied upon only to give a sealing pressure. Several embodiments of the locking means may be used, and the choice of a specific type depends upon manufacturing costs, convenience, and its ability to be withdrawn after considerable use. For example, one preferred type of locking member is simply a coil spring 32. This spring 32 may be fed in through the single access opening 30 into the groove 28 and passed around it. Its flexibility enables it to encircle the pipe and the grooves 20 and 28. The access hole 30 itself may be a slot but is preferably round, as shown, and is somewhat larger in diameter than the groove 28 and rib 26 so as to act as a guide thereinto for the spring 32. The rim 33 of the opening 30 is preferably raised slightly to give further aid in inserting the spring 32 therethrough. The spring 32 may be provided with a handle at one end to facilitate its insertion and withdrawal, or one end may be formed to facilitate easy gripping by pliers. If desired, the other end of the spring may be provided with a locking device to engage some of the coils on the opposite end of the spring, though this is not usually necessary. Nor is it essential that the garter spring be long enough to extend around the annular keyway for a full 360°.

An alternative to the metal coil spring 32 is the use of a solid rod or hollow tube of nylon or other plastic material which has sufficient strength. Such plastic locking means have the advantage of flexibility without having coils that might be filled with dirt, but they currently have the disadvantage of being somewhat more expensive. Nylon tubing, however, is less expensive than nylon rods, since nylon is sold by weight.

Another form which the locking member may take is shown in Figs. 5–7 and comprises a U-shaped, rigid rod 40 with coil springs 41, 42 at each end. The springs 41, 42 may be wound so that their inner diameter is slightly smaller than that of the outer diameter of the U-shaped rod 40, so that when they are applied over its ends, they will squeeze around it and lock without any welding or other securing being necessary. In this instance, two access holes 43 and 44 are provided, and the locking action is obtained substantially over the 180° arc which the two coil springs 41, 42 provide by curving in around the pipe and toward each other. Actually they need not extend even this far around. This form of the invention has the advantage that it is much easier to apply and to pull out, since the U-shaped rod 40 acts as a handle to make application and removal easy. (See Fig. 6.)

In operation, the male coupler 12 is inserted into the female coupler 14, the O-ring 31 having previously been inserted into its groove 29. The insertion of the male coupler 12 is stopped when its locking groove 20 is opposite the locking groove 28 of the female coupler 14. Its wall 22 has by that time engaged the O-ring 31, due to the relative spacing of the groove 20 further from the end 21 than the grooves 28 and 29 are from each other. At that time, the locking spring 32 or other locking member 40, 41, 42 is inserted through the access hole 30 (or holes 43, 44), and then the coupling is completed. The very simplicity of this operation is an important advantage of the present invention.

Removal is equally simple. In the case of the spring 32, one end is grasped and is pulled out. The same thing happens when nylon tubing or rod is used, or other plastic material. The removal of the U-rod 40 is even easier, since the U-handle portion 40 is grasped with the hand and it is pulled. The springs 41, 42 are immediately pulled out of the grooves 20, 29.

Obviously, with this invention it is quite simple for a farmer to assemble a long string of pipe from a series of pipe sections, to leave this pipe in the field as long as may be necessary, and then to disassemble it at the end of that period for storage. In each instance, the coupling takes only a few moments and the disassembly can be done in a matter of a very few seconds.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. In a readily separable coupling between partially telescoped tubular parts, each of said parts having registering semicircular grooves and said grooves cooperating to form an annular channel of circular cross section between said parts, the outer of said telescoped parts having two apertures, one at each of two diametrically opposite sides thereof and each of which communicates tangentially with said channel from the same side, a rigid U-shaped locking rod having spaced parallel legs adapted to enter within said apertures, and each of said legs of said U-shaped rod having a readily deflectable non-compressible and stiffly flexible free end portion, said end portions simultaneously extending into and conforming to the curvature of said channel between said apertures by manual pressure on the bite of said U-shaped rod, said parallel legs maintaining said bite portion spaced from said tubular parts whereby to be readily grasped for insertion and removal of said free end portions.

2. The structure as set forth in claim 1 in which said free end portions of each leg are coiled springs.

References Cited in the file of this patent

UNITED STATES PATENTS

| | | |
|---|---|---|
| 1,882,520 | Pollard | Oct. 11, 1932 |
| 2,038,867 | Wilson | Apr. 28, 1936 |
| 2,087,916 | Lanninger | July 27, 1937 |
| 2,256,845 | Lanninger | Sept. 23, 1941 |
| 2,436,407 | Stephens | Feb. 24, 1948 |
| 2,458,714 | Mahoney | Jan. 11, 1949 |
| 2,597,482 | Harrison et al. | May 20, 1952 |

FOREIGN PATENTS

| | | |
|---|---|---|
| 462,193 | Great Britain | Mar. 4, 1937 |
| 79,392 | Denmark | Mar. 31, 1955 |